United States Patent
Bachiri et al.

(10) Patent No.: US 7,844,693 B2
(45) Date of Patent: Nov. 30, 2010

(54) METHODS AND SYSTEMS INVOLVING MONITORING WEBSITE CONTENT

(75) Inventors: Mohamed Bachiri, Melrose, MA (US);
 Chenita Daughtry, Roxbury, MA (US);
 Robert Weir, Westford, MA (US);
 Carol Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/854,803

(22) Filed: Sep. 13, 2007

(65) Prior Publication Data
 US 2009/0077223 A1    Mar. 19, 2009

(51) Int. Cl.
 *G06F 15/173* (2006.01)
(52) U.S. Cl. .................. 709/223; 709/203; 709/217; 709/219; 709/224
(58) Field of Classification Search ............. 709/228, 709/203, 217, 219, 223, 224
 See application file for complete search history.

(56) References Cited

U.S. PATENT DOCUMENTS

| | | | |
|---|---|---|---|
| 5,978,828 A | 11/1999 | Greer et al. | |
| 6,366,933 B1 | 4/2002 | Ball et al. | |
| 6,571,256 B1 * | 5/2003 | Dorian et al. | 707/104.1 |
| 7,689,510 B2 * | 3/2010 | Lamkin et al. | 705/51 |
| 2003/0140152 A1 * | 7/2003 | Creig Humes | 709/229 |
| 2004/0015703 A1 * | 1/2004 | Madison et al. | 713/185 |
| 2004/0044966 A1 * | 3/2004 | Malone | 715/530 |
| 2004/0073596 A1 * | 4/2004 | Kloninger et al. | 709/200 |
| 2005/0192814 A1 * | 9/2005 | Challener et al. | 705/1 |
| 2005/0216439 A1 | 9/2005 | Kawakita | |
| 2005/0262239 A1 | 11/2005 | Kawakita | |
| 2005/0283792 A1 * | 12/2005 | Swix et al. | 725/9 |
| 2007/0047568 A1 * | 3/2007 | Wang et al. | 370/429 |
| 2008/0071792 A1 * | 3/2008 | Li et al. | 707/10 |

\* cited by examiner

*Primary Examiner*—Lashonda T Jacobs
(74) *Attorney, Agent, or Firm*—Cantor Colburn LLP; Daniel McLoughlin

(57) ABSTRACT

An exemplary embodiment of a system for monitoring website content, including, a browser client operative to send a first request for content to a first website server, the content stored on a second website server, an intermediate server, operative to receive a URL associated with the content, from the first website sever, the URL comprising an address of the intermediate server, an address of the content, and an address for threshold data stored on the intermediate server associated with the content, the threshold data including a plurality of thresholds, the intermediate server further configured to send a second request for the content to the second website server, receive the content, determine whether the content exceeds the plurality of thresholds associated with the content, deny the first request for content, responsive to determining that the content exceeds one of the plurality thresholds associated with the content.

8 Claims, 2 Drawing Sheets

METHODS AND SYSTEMS INVOLVING MONITORING WEBSITE CONTENT

BACKGROUND OF THE INVENTION

1. Field of the Invention

This invention relates generally to managing Internet website links and specifically to monitoring Internet website content changes.

2. Description of Background

Internet website administrators (administrators) often include website links that reference content on other websites. The administrators may have no control over the content on the referenced websites. Content on the referenced website may be added or removed without notifying an administrator. If the referenced website content has been changed, the administrator may no longer desire to include the link to the referenced website content.

A website administrator may use link monitoring systems that periodically check the website links referenced by websites to determine if there are changes to content on the referenced website. If a referenced website has changed, the monitoring system may notify the website administrator. These monitoring systems do not prevent users of the website from accessing referenced website if the content on the referenced website has changed.

SUMMARY OF THE INVENTION

The shortcomings of the prior art are overcome and additional advantages are achieved through an exemplary method for monitoring website content, the method comprising, receiving, at an intermediate server, a URL from a first website server, the URL associated with content stored in a second website server, wherein the URL comprises an address of the intermediate server, an address of the content and an address for threshold data stored in the intermediate server associated with the content, the threshold data including a plurality of thresholds associated with the content, wherein the URL received by the intermediate server is sent by the first website server responsive to receiving a first request for content from a browser client, sending a second request for the content to the second website server from the intermediate server, receiving, at the intermediate server, the content from the second website server, comparing the content to benchmark data associated with the content stored in the intermediate server, determining whether the content exceeds one of the plurality of thresholds associated with the content by the intermediate server, denying the first request for content, responsive to determining that the content exceeds one of the plurality thresholds associated with the content, and sending a denial message for the first request for the content from the intermediate server to the browser client, responsive to denying the first request for content.

An exemplary embodiment of a system for monitoring website content, comprising, a browser client operative to send a first request for content to a first website server, wherein the content is stored on a second website server, an intermediate server, operative to receive a URL associated with the content, from the first website sever, the URL comprising an address of the intermediate server, an address of the content on the second website server, and an address for threshold data stored on the intermediate server associated with the content, the threshold data including a plurality of thresholds associated with the content, the intermediate server further configured to send a second request for the content to the second website server, receive the content from the second website server, compare the content to benchmark data associated with the content stored in the intermediate server, determine whether the content exceeds one of the plurality of thresholds associated with the content, deny the first request for content, responsive to determining that the content exceeds one of the plurality thresholds associated with the content; and send a denial message for the first request for content to the browser client, responsive to denying the first request for content.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems and methods involving monitoring website content are provided. Several exemplary embodiments are described.

Internet website administrators often include links on websites to content found on other websites administered by other administrators. If a website administrator includes a link to content on another website, the website administrator may not have control over the content on the other website. The content may change and include undesirable information.

Previous website monitoring systems periodically determine if a linked content has changed or is no longer available, and will notify the website administrator if the content has changed. However, the previous website monitoring systems do not prevent a user from receiving the linked content if the content has changed. Therefore, it is desirable for a website monitoring system to determine if linked content has changed based on thresholds defined by an administrator, and prevent a user from receiving the content if the change in the content exceeds the defined thresholds. It is also desirable for a website monitoring system to determine if linked content has changed to exceed the defined thresholds and notify the administrator if the content exceeds the defined thresholds.

Figure 1:
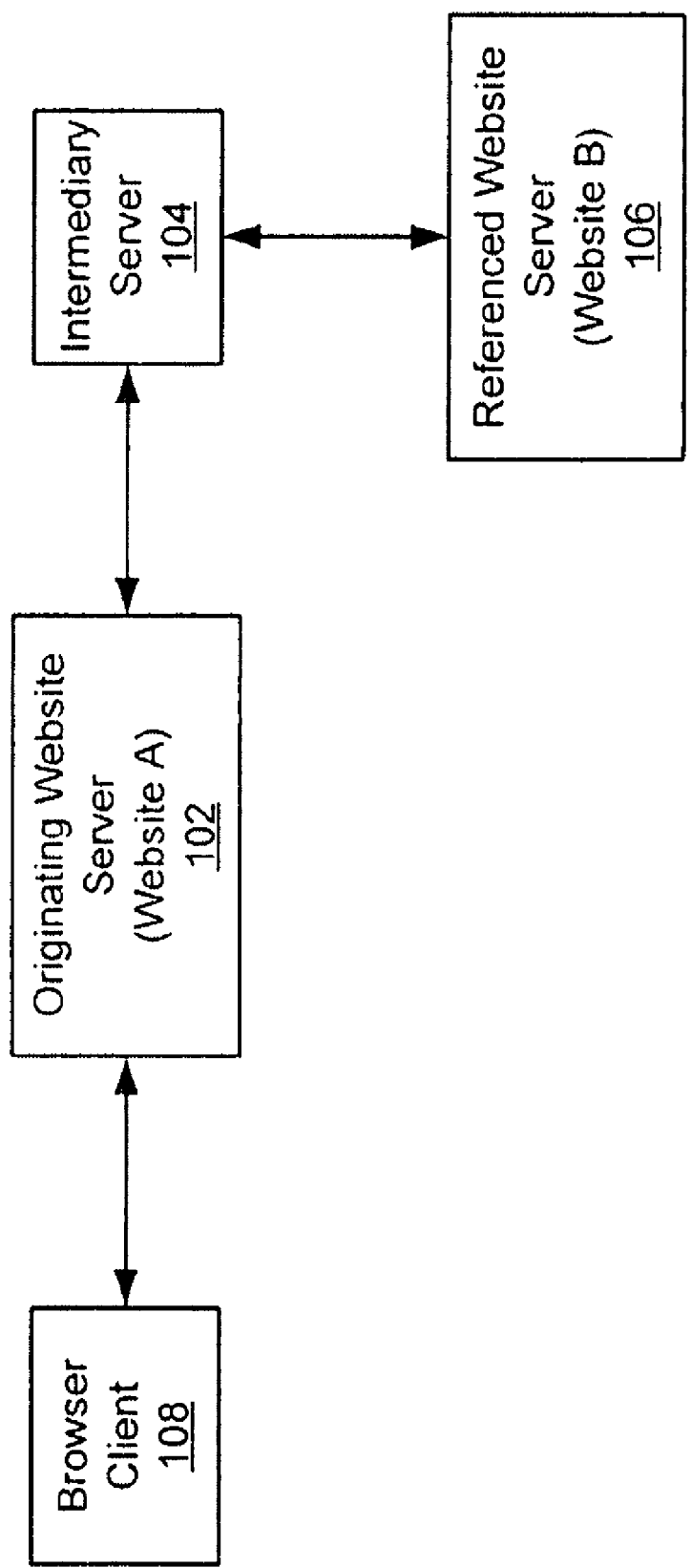
FIG. 1 illustrates an exemplary embodiment of a system for monitoring website content.

In this regard, FIG. 1 illustrates an exemplary embodiment of a system for monitoring website content. The system includes a browser client 108 communicatively linked to an originating website server (website A) 102, and an intermediary server 104 communicatively linked to website A 102 and a referenced website server (website B) 106.

Figure 2:
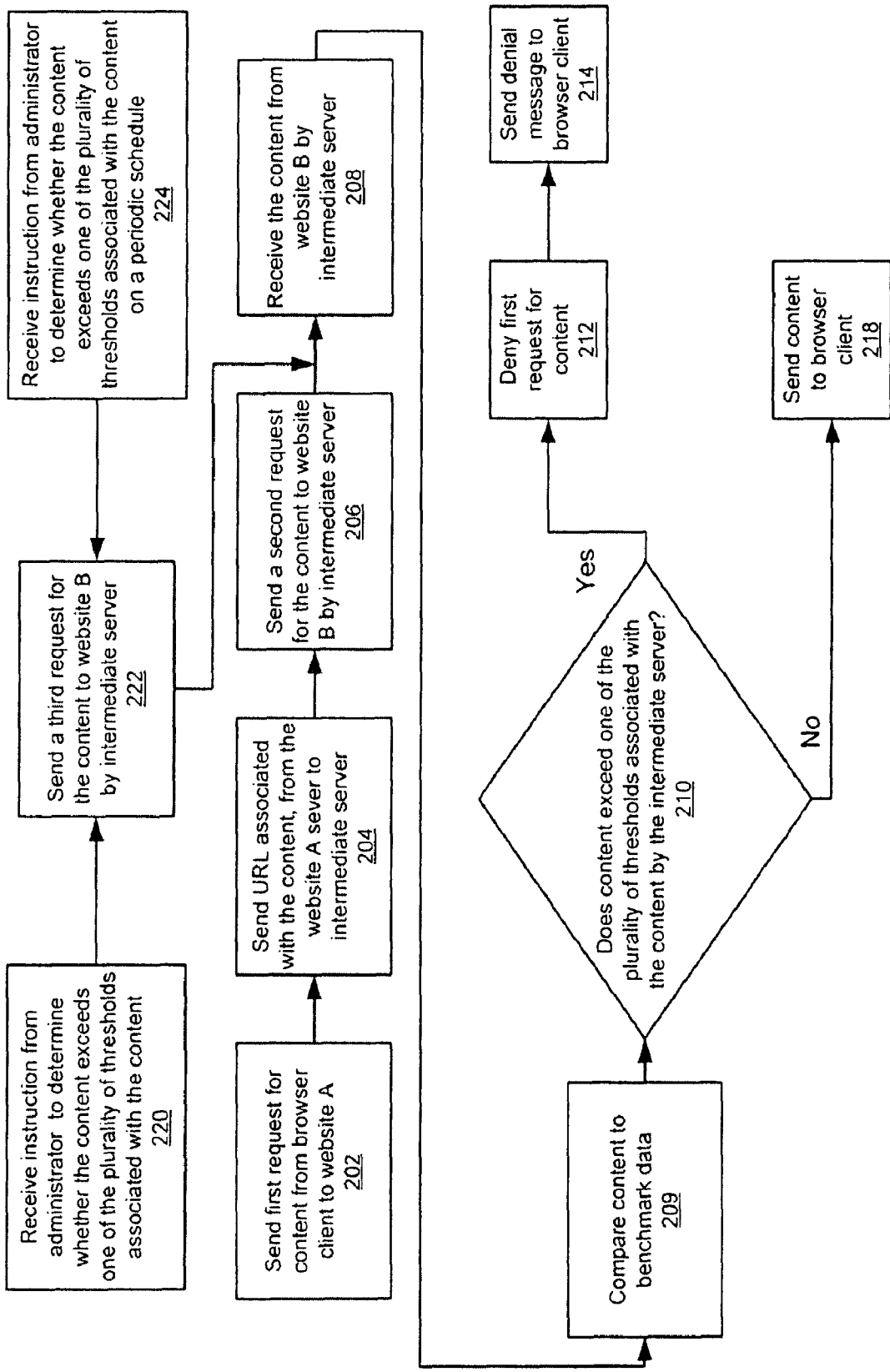
FIG. 2 illustrates an exemplary method for monitoring website content.

FIG. 2 illustrates an exemplary method for monitoring website content. Website A 102 (found in FIG. 1) includes a website link (link) to content on website B 106. A user of the browser client 108 may select the link by, for example, clicking on the link with a mouse. The selection of the link instructs the browser client 108 to send a first request for content from the browser client to the website A 102, as described in block 202 of FIG. 2. In block 204, the website A receives the request for content from the browser client 108, and sends a second request that includes a URL assigned to the link to the intermediary server 104. The URL includes an address of the intermediary server 104, an address of the content stored on website B 106, and an address for threshold data that is associated with the content and stored on the intermediary server 104. The threshold data includes a plurality of thresholds that may be defined by the administrator.

The plurality of thresholds may include, for example, if a change in the date of a header associated with the content has occurred, whether a total number of changes, defined by the administrator, to the text characters and non-textual content has occurred, whether a word defined by the administrator is included in the content, whether a word defined by the administrator is not included in the content, whether a phrase defined by the administrator is included in the content, whether, a phrase defined by the administrator is not included in the content, whether a number of changes defined by the administrator to text characters in the content has occurred, whether a number of changes defined by the administrator to non-textual elements in the content has occurred, and whether a change in an image in the content has occurred. Non-textual elements may include, for example graphics, icons, sounds, and documents and files included in and linked-to in the content.

Referring again to FIG. 2, once the intermediary server 104 receives the second request from the website A 102, the intermediary server 104 receives the content from the address of the content stored on website B 106 in block 208. The intermediary server 104 compares the received content to benchmark data stored on the intermediary server 104 in block 209. The benchmark data is associated with the content and is stored on the intermediary server 104 when the administrator defines the plurality of thresholds for the content. Once the received content is compared with the benchmark data, the intermediary server 104 determines if the received content exceeds one of the plurality of thresholds in block 210. If the intermediary server 104 determines that one of the plurality of thresholds has been exceeded, the intermediary server 104 denies the first request for content in block 212, and sends a denial message to the browser client 108 in block 214. If the intermediary server 104 determines that the content does not exceed any of the plurality of thresholds, the intermediary server 104 sends the content to the browser client 108.

The method illustrated in FIG. 2 also may include blocks 220, 222, and 224. In block 220, the intermediary server 104 receives an instruction from the administrator to send a third request for the content to website B and to determine whether the content exceeds the plurality of thresholds. The intermediary server 104 sends the third request for the content to the website B 106 in block 222. Block 220 allows the administrator to manually direct the intermediary server to perform the determination. The administrator may also instruct the intermediary server 104 to perform the determination automatically on a periodic schedule, for example, daily or weekly as described in block 224.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for monitoring website content, the method comprising:
    receiving, at an intermediate server, a URL from a first website server, the URL associated with content stored in a second website server, wherein the URL comprises an address of the intermediate server, an address of the content and an address for threshold data stored in the intermediate server associated with the content, the threshold data including, a number of changes to text characters in the content stored on the second website server, wherein the number of changes to text characters in the content is defined by the administrator of the first website server;
    wherein the URL received by the intermediate server is sent by the first website server responsive to receiving a first request for content from a browser client;
    sending a second request for the content to the second website server from the intermediate server;
    receiving, at the intermediate server, the content from the second website server;
    comparing the content to benchmark data associated with the content stored in the intermediate server;
    determining whether the content exceeds one of the plurality of thresholds associated with the content by the intermediate server;
    denying the first request for content, responsive to determining that the content exceeds one of the plurality thresholds associated with the content; and
    sending a denial message for the first request for the content from the intermediate server to the browser client, responsive to denying the first request for content.

2. The method of claim 1, wherein the plurality of thresholds associated with the content include:
    a change in the date of a header associated with the content;
    a number of changes to the content defined by an administrator of the first website server, wherein the changes to the content include:
        a number of text characters changed; and
        a number of non-textual changes to the content;
    a word defined by the administrator of the first website server is included in the content;
    a word defined by the administrator of the first website server is not included in the content;
    a phrase defined by the administrator of the first website server is included in the content;
    a phrase defined by the administrator of the first website server is not included in the content;
    a number of changes to non-textual elements in the content, wherein the number of changes to non-textual elements in the content is defined by the administrator of the first website server; and
    a change in an image in the content.

3. The method of claim 2, the method further comprising sending the content to the browser client from the intermediate server, responsive to determining that the content does not exceed the plurality of thresholds associated with the content.

4. The method of claim 2, the method further comprising:
    receiving an instruction from an administrator of the first website server by the intermediate server to determine whether the content exceeds one of the plurality of thresholds associated with the content;
    sending a third request for the content to the second website server by the intermediate server;
    comparing the content to benchmark data associated with the content, wherein the benchmark data is stored in the intermediate server;

determine whether the content exceeds the plurality of thresholds associated with the content by the intermediate server; and sending a notification message to the administrator of the first website server from the intermediate server, responsive to determining that the content exceeds one of the plurality of thresholds associated with the content.

5. The method of claim 4, wherein the instruction includes a schedule for automatically directing the intermediate server to determine whether the content exceeds one of the plurality of thresholds associated with the content.

6. A system for monitoring website content, comprising:
a browser client operative to send a first request for content to a first website server, wherein the content is stored on a second website server;
an intermediate server, operative to receive a URL associated with the content, from the first website sever, the URL comprising an address of the intermediate server, an address of the content on the second website server, and an address for threshold data stored on the intermediate server associated with the content, the threshold data including a number of changes to text characters in the content stored on the second website server, wherein the number of changes to text characters in the content is defined by the administrator of the first website server, the intermediate server further configured to send a second request for the content to the second website server, receive the content from the second website server, compare the content to benchmark data associated with the content, wherein the benchmark data is stored in the intermediate server, determine whether the content exceeds the plurality of thresholds associated with the content, deny the first request for content, responsive to determining that the content exceeds one of the plurality thresholds associated with the content, and send a denial message for the first request for content to the browser client, responsive to denying the first request for content.

7. The system of claim 6, wherein the plurality of thresholds associated with the content include:
a change in the date of a header associated with the content;
a number of changes to the content defined by an administrator of the first website server, wherein the changes to the content include:
a number of text characters changed; and
a number of non-textual changes to the content;
a word defined by the administrator of the first website server is included in the content;
a word defined by the administrator of the first website server is not included in the content;
a phrase defined by the administrator of the first website server is included in the content;
a phrase defined by the administrator of the first website server is not included in the content;
a number of changes to non-textual elements in the content, wherein the number of changes to non-textual elements in the content is defined by the administrator of the first website server; and
a change in an image in the content.

8. The system of claim 7, wherein the intermediate server is further operative to send the content to the browser client from the intermediate server, responsive to determining that the content does not exceed the plurality of thresholds associated with the content.

* * * * *